United States Patent [19]

Chung et al.

[11] Patent Number: 5,474,214

[45] Date of Patent: Dec. 12, 1995

[54] PNEUMATICALLY CONTROLLED AIR GREASE GUN

[75] Inventors: Cheng-Hsin Chung; Shuun-Fan Yang, both of Taichung, Taiwan

[73] Assignee: King Cho Machinery Industrial Co., Ltd., Taichung, Taiwan

[21] Appl. No.: 260,729

[22] Filed: Jun. 15, 1994

[51] Int. Cl.⁶ .................... G01F 11/00; B67D 5/42
[52] U.S. Cl. .......................... 222/262; 222/389
[58] Field of Search .................... 222/386, 389, 222/394, 252, 256, 258, 259, 261, 262, 263, 510

[56] References Cited

U.S. PATENT DOCUMENTS

| | | | |
|---|---|---|---|
| 1,969,254 | 8/1934 | Bizzarri | 222/389 X |
| 1,981,905 | 11/1934 | Davis | 222/389 X |
| 2,142,081 | 1/1939 | Olive | 222/389 X |
| 2,770,394 | 11/1956 | Mueller | 222/389 X |
| 3,085,715 | 4/1963 | Douglas | 222/389 X |
| 3,095,125 | 6/1963 | Bundy | 222/389 X |
| 3,403,818 | 10/1968 | Enssle | 222/389 X |
| 3,825,155 | 7/1974 | Morault | 222/389 X |
| 5,067,591 | 11/1991 | Fehlig | 222/389 X |
| 5,318,207 | 6/1994 | Porter et al. | 222/389 X |

FOREIGN PATENT DOCUMENTS

| | | | |
|---|---|---|---|
| 1133293 | 3/1957 | Italy | 222/389 |
| 187545 | 11/1966 | U.S.S.R. | 222/389 |

*Primary Examiner*—Kevin P. Shaver
*Attorney, Agent, or Firm*—Oblon, Spivak, McClelland, Maier, & Neustadt

[57] ABSTRACT

An air grease gun includes a grip, a barrel, a spout pipe unit and a grease storage tube. A generally Y-shaped air passage is formed in the grip and is bifurcated into a first branch and a second branch at the lower end portion of the grip. A compressed air source is communicated with the first branch. The second branch is communicated with the lower air chamber of the grease storage tube via an air tube. A valve normally closes the upper section of the air passage, which is above the first and second branches. The compressed air flowing from the compressed air source enters the grease storage tube via the first and second branches and via the air tube so as to push a tube piston upward, thereby impelling the grease in the grease storage tube into the barrel. Upon actuation of a trigger, the valve opens the air passage so that the compressed air flows into the barrel through the upper section of the air passage, thereby pneumatically moving the grease in the barrel to the spout outlet of the gun.

2 Claims, 5 Drawing Sheets

PNEUMATICALLY CONTROLLED AIR GREASE GUN

BACKGROUND OF THE INVENTION

1. Field of the Invention

This invention relates to an air grease gun, more particularly to an air grease gun in which grease is in a pneumatic manner.

2. Description of the Related Art

The improvement of this invention is directed to a conventional air grease gun which is shown in FIG. 1. As illustrated, the conventional air grease gun includes a grip member 11, a coupler pipe 12 screwed to the front end or the grip member 11, a grease discharge pipe 13 coupled with the front end of the coupler pipe 12 by means of a fitting 131, and a grease storage tube 14 threaded to the internally threaded lower end portion 121 of the coupler pipe 12. A bottom cover 143 is removably mounted on the lower end of the grease storage tube 14. A longitudinal guide rod 144 is mounted removably in the central portion of the grease storage tube 14 and can be removed from the same by actuation of a rotary wheel 145. A trigger 16 is installed on the grip member 11 so as to open or close a trigger-controlled valve 17 which is disposed in the grip 11. A valve spring 17 biases the valve 17 to close the air passage 112. As illustrated, the grip 11 and the coupler pipe 12 define therebetween an interior chamber 111, (see FIG. 2) in which a barrel piston 150, a piston rod 151 integral with the barrel piston 150, and a barrel spring 152 are contained.

Referring to FIG. 2, the grip 1100 has an air passage 112 formed therethrough in communication with the interior chamber 111. which is formed with an inlet 113 that accepts compressed air from a compressed air source (not shown). The valve 17 normally closes the air passage 112. The trigger 16 can be actuated to move the valve 17 to the right so as to open the air passage 112, thus permitting compressed air to flow from the compressed air source into the interior chamber 111 via the air passage 112.

The hollow barrel 1500 of the gun is coupled with the grip 1100 and includes a diameter-reduced grease outlet portion 153 located at the front end portion thereof, and a partition 154 having a central hole and secured in the barrel 1500, in such a manner that a grease-tight seal is established between the peripheral wall of the barrel 1500 and the partition 154, so as to define a grease passage space 155 in front of the partition 154 in the barrel 1500. The barrel piston 150 is slidably mounted within the rear end portion of the barrel 1500 so as to define a rear air chamber 156 behind the partition 154 in the barrel 1500. The rear air chamber 156 is communicated with the air passage 112 of the grip 1100. The piston rod 151 is positioned in the barrel 1500 and has a front end portion extending through the central hole of the partition 154, and a rear end connected securely to the barrel piston 150. A grease-tight seal is established between the partition 154 and the piston rod 151. The barrel spring 152 is sleeved on the piston rod 151 in the barrel 1500 between the partition 154 and the barrel piston 150 so as to bias the barrel piston 150 to move rearward. A pressure relief device or a pressure relief opening 157 is formed through the peripheral wall of the barrel 1500 so as to relieve air pressure in the rear air chamber 156 of the barrel 1500 when increasing beyond a specified value so that the piston spring 152 can bias the barrel piston 150 to move rearward. The front end portion of the piston rod 151 can move into the diameter-reduced grease outlet portion 153 of the barrel 1500 so as to impel grease coming from the grease passage space 155 of the barrel 1500 into the fitting 131.

The grease discharge pipe 13 and the fitting 131 together constitute a spout pipe unit 1300 which is connected securely to the diameter-reduced grease outlet portion 153 of the barrel 1500 and which has a spout outlet 132 formed in the front end of the spout pipe unit 1300, and an interior bore 133 that is communicated with the grease passage space 155 of the barrel 1500. As best shown in FIG. 3, the interior bore 133 of the spout pipe unit 1300 has a large-diameter front section 134 and a small-diameter rear section 135 which is connected to and located just behind the large-diameter front section 134 and which has a diameter smaller than that of the large-diameter section 134. The sections 134 and 135 are located in the fitting 131. A ball 136 is accommodated in the large-diameter front section 134 of the fitting 131 and is biased by a ball spring 137 to close the front end of the small-diameter rear section 135 of the fitting 131, thereby preventing grease in the small-diameter rear section 135 from moving forward to the spout outlet 132 of the spout pipe 13 via the large-diameter front section 134 unless an additional force is applied to the same.

Again referring to FIG. 2, the vertical grease storage tube 14 has an externally threaded upper end portion 146 (see FIG. 1) coupled with the internally threaded lower end portion 121 of the coupler pipe 12. A horizontal tube piston 142 is slidably mounted within the grease storage tube 14 so as to define a grease storage chamber 148 above the tube piston 142, which is communicated with the grease passage space 155 of the barrel 1500. In use, as illustrated, a grease which is shaped in the form of a column is charged into the tube 14. As illustrated, the tube piston 142 has a central hole formed therethrough through which the guide rod 44 extends in such a manner that a grease-tight seal is established therebetween. A tube spring 147 pushes the tube piston 142 upward so as to move the grease in the grease storage chamber 148 into the grease passage space 155 of the barrel 1500. The ball spring 137 provides to the ball 136 a biasing force which is greater than upward biasing force of the tube spring 147 so that the grease fed from the tube 14 cannot pass beyond the ball 136. However, after long-term use, the ball spring 137 may become fatigued in terms of elasticity, thereby causing difficulties in feeding the grease from the tube 14 into the barrel 1500.

SUMMARY OF THE INVENTION

The main object of this invention is to provide a pneumatically controlled air grease gun with a grease storage tube which feeds effectively feeds grease into the barrel of the gun in a pneumatic manner.

According to this invention, the air grease gun includes a grip, a barrel, a spout pipe unit and a grease storage tube. A generally Y-shaped air passage is formed in the grip and is bifurcated into a first branch and a second branch at the lower end portion of the grip. A compressed air source is communicated with the first branch. The second branch is communicated with the lower air chamber of the grease storage tube by means of an air tube. A valve normally closes the upper section of the air passage, which is above the first and second branches. The compressed air flowing from the compressed air source enters the grease storage tube via the first and second branches and via the air tube so as to push a tube piston upward, hereby impelling the grease in the grease storage tube into the barrel. Upon actuation of a trigger, the valve opens the air passage so that the compressed all flows into the barrel through the upper section of the air passage, thereby pneumatically moving the grease in the barrel to the spout outlet of the gun.

BRIEF DESCRIPTION OF THE DRAWINGS

Other features and advantages of this invention will become apparent in the following detailed description of the preferred embodiment of this invention with reference to the accompanying drawings, in which.

DESCRIPTION OF THE PREFERRED EMBODIMENT

Figure 4:
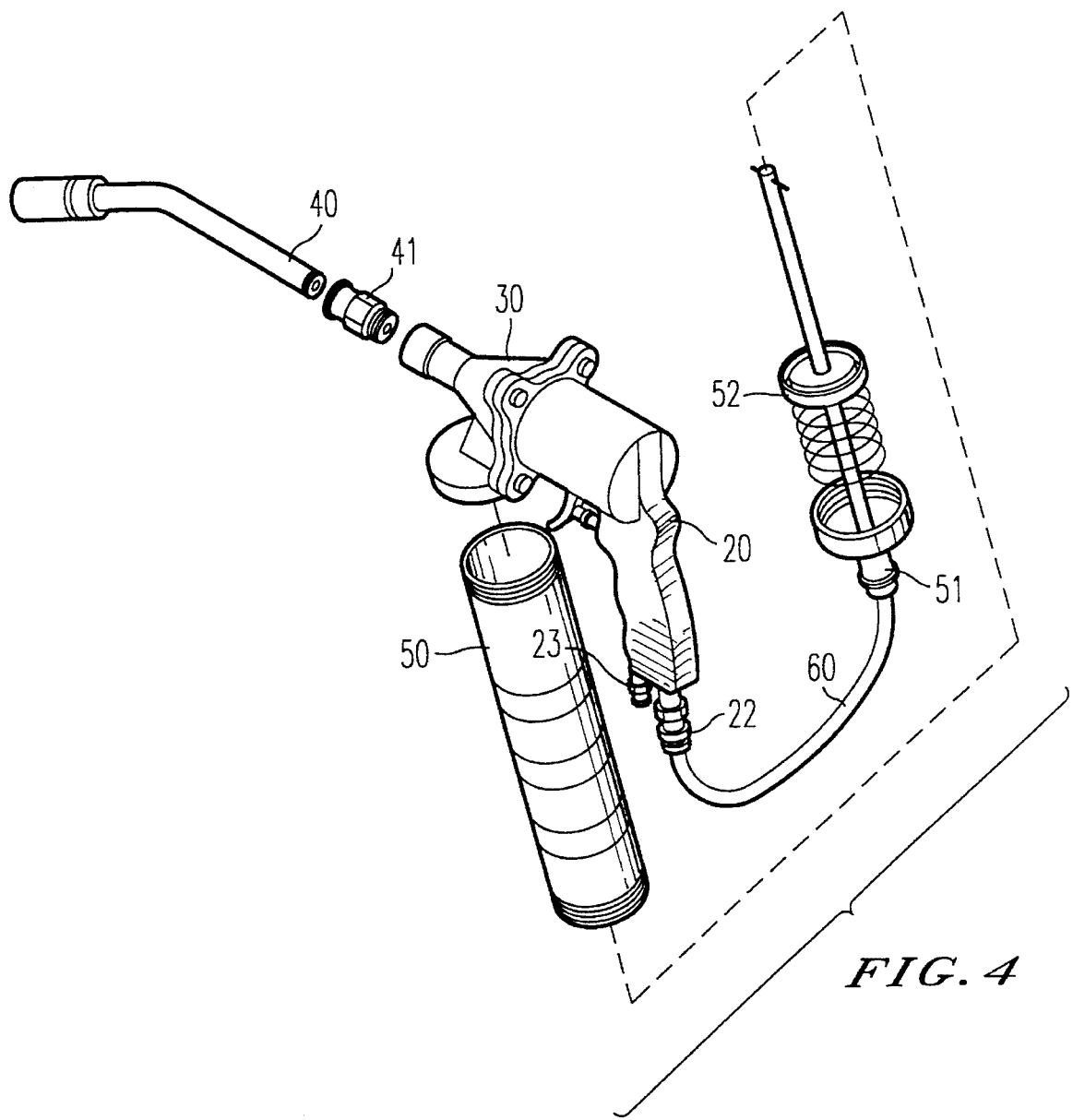
FIG. 4 is a partially exploded view of an air grease gun according to the present invention.

Referring to FIG. 4, the air grease gun of this invention includes a grip 20 equipped with an air inlet element 22 and an air outlet element 23, a barrel 30; a spout pipe unit consisting of a grease discharge pipe 40 and a fitting 41, a grease storage tube 50, a connector 51, a tube piston 52 and an air tube 60.

Figure 1:
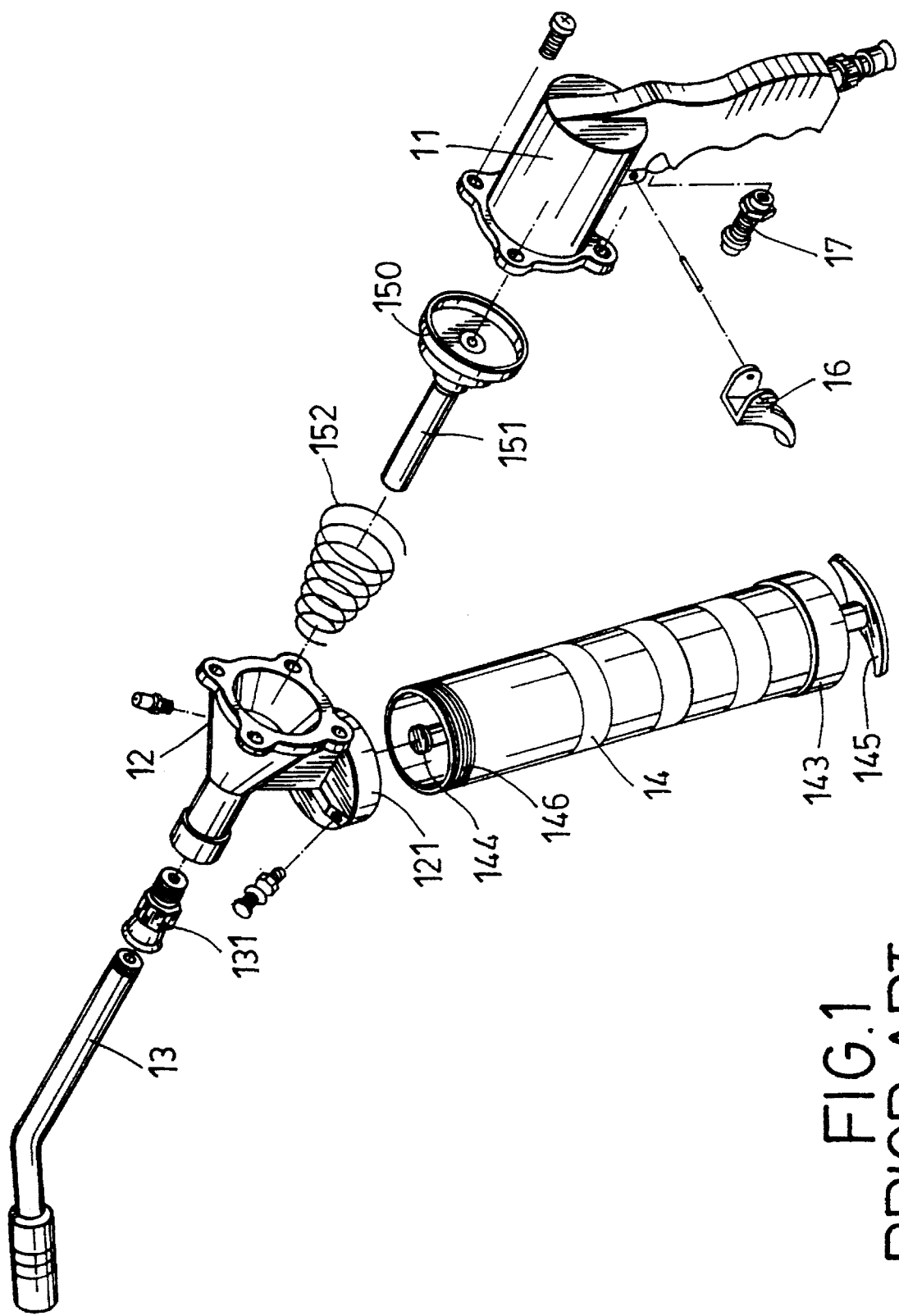
FIG. 1 is an exploded view of a conventional air grease gun.
Figure 2:
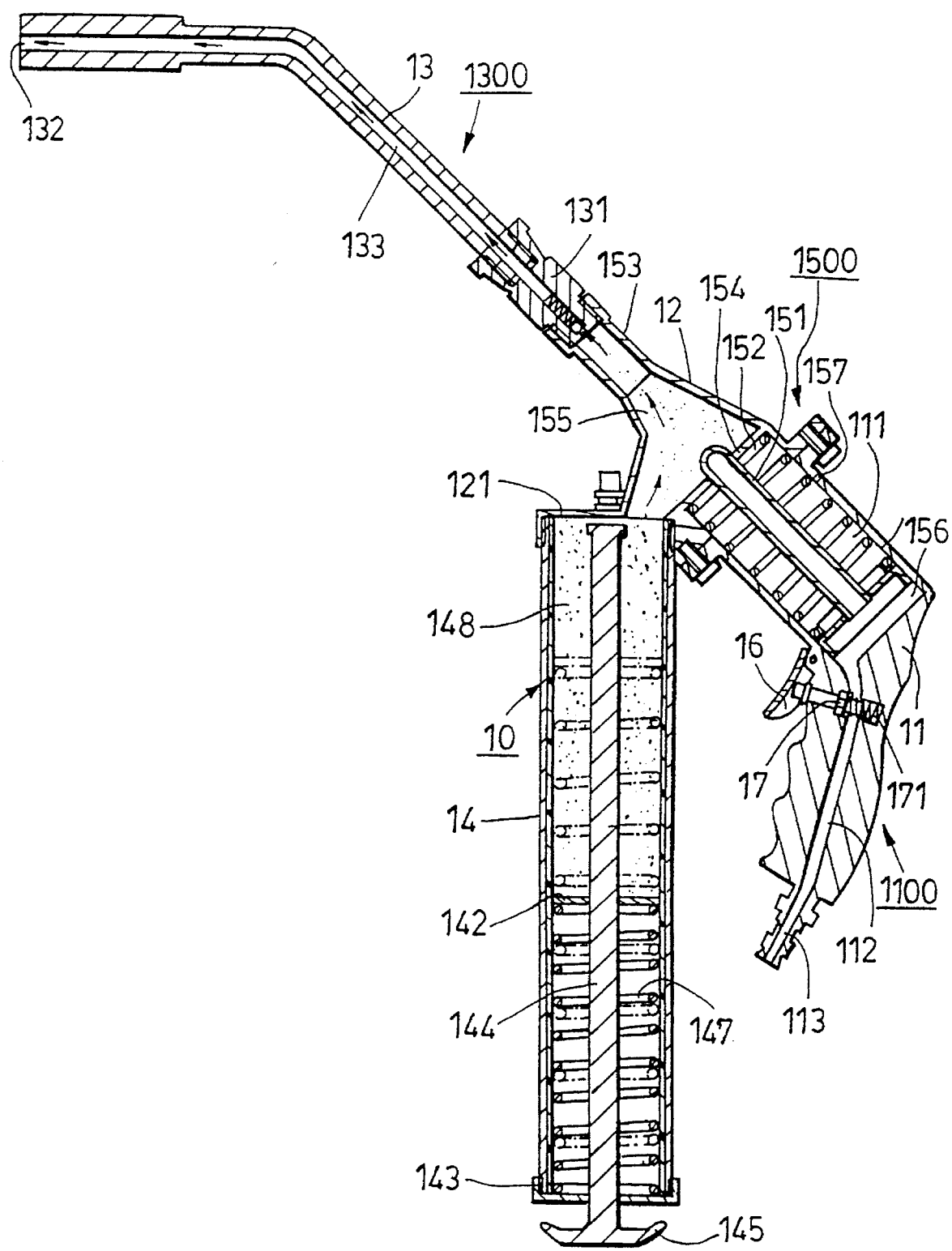
FIG. 2 is a sectional view of the conventional air grease gun.
Figure 3:
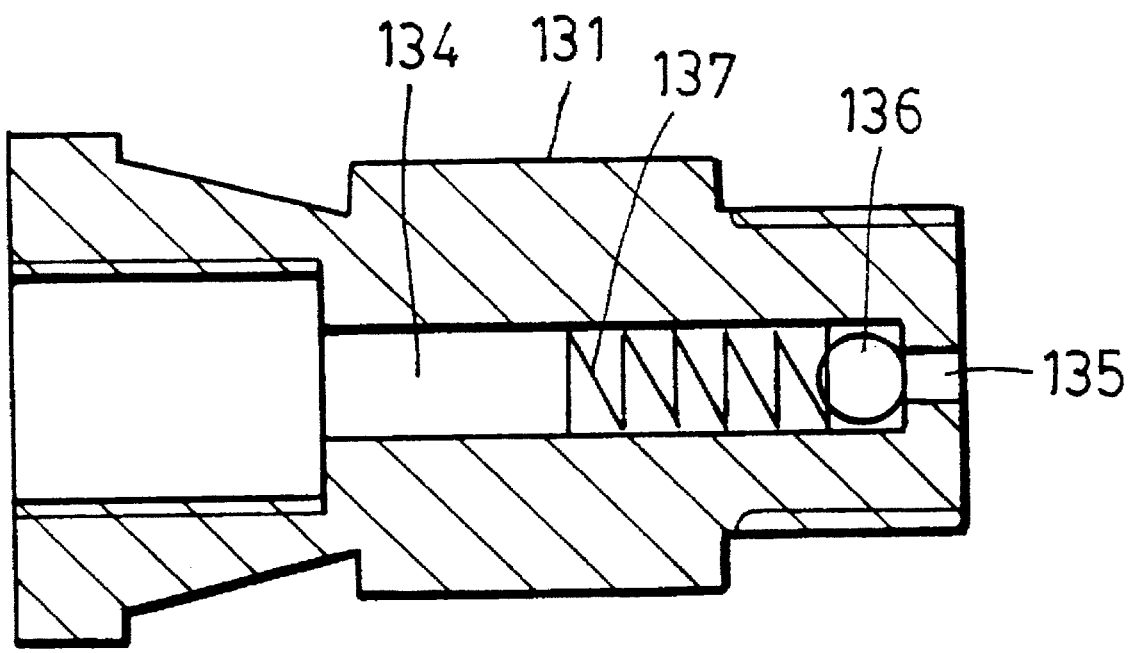
FIG. 3 is a sectional view showing the fitting of the conventional air grease gun.

All of the barrel 30, grease discharge pipe 40 and fitting 41 are similar to those of the air grease gun shown in FIGS. 1, 2 and 3 in construction, and will not be detailed.

The feature of this invention resides in the manner in which the grease 10 (see FIG. 5) is fed from the grease storage tube into the barrel 30.

Figure 5:
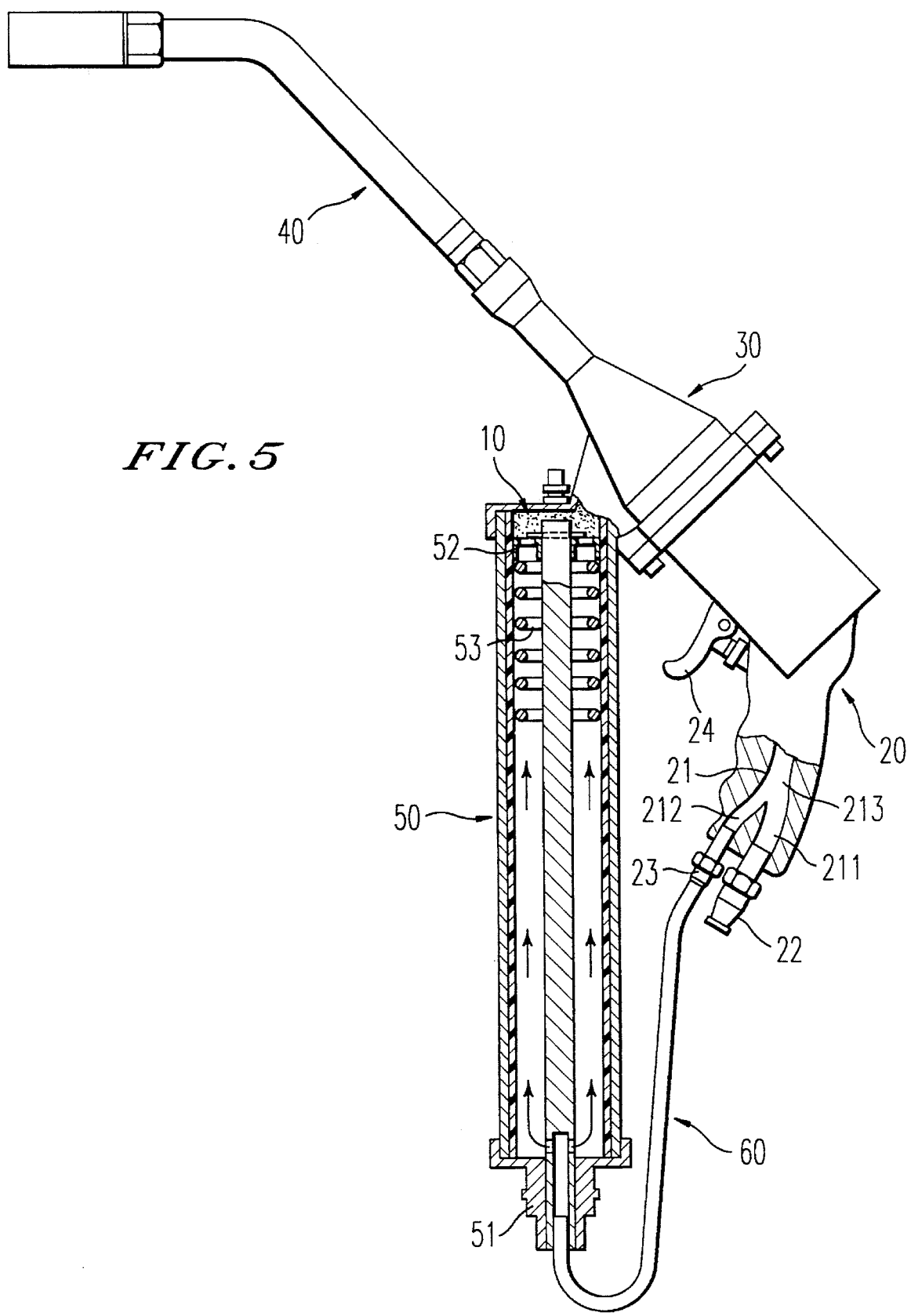
FIG. 5 is a schematic view illustrating how an air tube is interposed between the grip and the grease storage tube of the air grease gun in accordance with the present invention.

Referring to FIG. 5, the grip 20 has an inverted Y-shaped air passage 21 formed therethrough, which is bifurcated into a first branch 211 and a second branch 212. The branches 211 and 212 define an upper section 213 of the air passage 21 thereabove, on which a trigger-controlled valve (not shown) is installed in the same manner as the valve 17 of the conventional air grease gun in FIG. 2. As illustrated, the air passage 21 is formed from the interior of a three-way tube. The inlet element 22 is attached to the bottom end portion of the grip 20 and is communicated with the inlet of the first branch 211 of the air passage 21 so as to accept compressed air from a compressed air source (not shown). The outlet element 22 is also attached to the bottom end portion of the grip 20 so as no intercommunicate the second branch 212 of the air passage 21 and the air tube 60.

The grease storage tube 50 is coupled with the barrel 30 in a known manner. The air tube 60 is coupled with the grease storage tube 50 by means of the connector 51 in such a manner that the air tube 60 is communicated with the lower air chamber of the grease storage tube 50 which is defined under the tube piston 52.

A coiled guide spring 53 is attached coaxially to the bottom surface of the tube piston 52 and has an outer diameter slightly smaller than the inner diameter of the grease storage tube 50 so as to maintain the tube piston 52 in a horizontal position when the tube piston 52 slides axially in the grease storage tube 50.

In use, when the inlet element 22 is coupled with the compressed air source, the compressed air flowing from the compressed air source enters the grease storage tube 50 via the first and second branches 211, 212 and via the air tube 60 so as to push the tube piston 52 upward, thereby impelling the grease 10 in the grease storage tube 50 into the barrel 30. Upon actuation of the trigger 24, the valve (not shown) opens the upper section 213 of the air passage 21 so that the compressed air flows into the barrel 30 through the upper section 213 of the air passage 21, thereby moving pneumatically the grease in the barrel 30 into the spout outlet or the grease discharge pipe 40.

Note that the assembly of the grease discharge pipe 40 and the fitting 41 is equipped with a spring loaded ball unit (not shown) in a known manner. The biasing force of the ball spring of the spring-loaded ball unit, is larger than upward pushing force of the tube piston 52 which comes from the compressed air in the grease storage tube 50. Accordingly, the spring-loaded ball can prevent the grease coming from the grease storage tube 50 from entering the grease discharge pipe 40 unless an additional pneumatic force is applied to the grease in the barrel 30 with the assistance of the oppressed air in the barrel 30.

With this invention thus explained, it is apparent that numerous modifications and variations can be made without departing from the scope and spirit of this invention. It is therefore intended that this invention be limited only as indicated in the appended claims.

We claim:

1. An air grease gun comprising:

a grip having a generally inverted Y-shaped air passage formed therethrough a trigger-controlled valve installed in said air passage and normally closing said air passage, a trigger actuatable to activate said valve so as to open said air passage, and a valve spring biasing said valve to close said air passage, said air passage being bifurcated into a first branch and a second branch at a lower end portion of said grip so as to define an upper section of said air passage above said first and second branches in such a manner that said valve is installed in said upper section of said air passage, said first branch of said air passage having an inlet adapted to accept compressed air from a compressed air source;

a hollow barrel coupled with said grip and including a diameter-reduced grease outlet portion located at a front end portion thereof, a partition having a central hole and secured in said barrel in such a manner that a grease-tight seal is established between a peripheral wall of said barrel and said partition, so as to define a grease passage space in front of said partition in said barrel, a barrel piston slidably mounted within a rear end portion of said barrel behind said partition so as to define a rear air chamber behind said barrel piston in said barrel, a piston rod positioned in said barrel and having a front end portion extending through said central hole of said partition and a rear end securely connected to said barrel piston, a barrel spring sleeved on said piston rod in in said barrel between said partition and said barrel piston so as to bias said barrel piston to move rearward, and a pressure relief device relieving air pressure in said rear air chamber of said barrel when the air pressure increases beyond a predetermined value so that said piston spring can bias said barrel piston to move rearward, said rear air chamber of said barrel being communicated with said upper section of said air passage of said grip, a grease-tight seal being established between said piston rod and said partition, said piston rod end portion being capable of moving into said diameter-reduced grease outlet portion of said barrel so as to impel grease out of said grease passage space;

a spout pipe unit connected securely to the front end portion of said barrel and having spout outlet formed in a front end of said spout pipe unit, and an interior bore which is formed through said spout pipe unit and which is communicated with said grease passage space of said barrel, said interior bore having a large-diameter front section and a small-diameter rear section which is connected to and located just behind said large diameter front section and which has a diameter smaller than that of said large-diameter from section;

a generally vertical grease storage tube coupled with the front end portion of said barrel at an upper end thereof and including a bottom end wall with an opening, a longitudinal guide rod removably mounted in a central portion of said grease storage tube, and a generally horizontal tube piston mounted slidably within said grease storage tube so as to define a grease storage chamber above said tube piston and a lower air chamber under said tube piston in said grease storage tube, said grease storage chamber being communicated with said grease passage space of said barrel, said tube piston having a central hole formed therethrough through which said guide rod extends in such a manner that grease-tight seal is established between said guide rod and said tube piston;

an air tube coupled with the lower end portion of said barrel at an end thereof and with the lower end portion of said grease storage tube at the other end so as to intercommunicate said second branch of said air passage of said barrel and said lower air chamber of said grease storage tube, thereby permitting compressed air from the compressed air source to flow into said lower air chamber in said grease storage tube via said first and second branches of said air passage of said grip and via said air tube in order to move said tube piston upward;

a ball accommodated in said large-diameter front section of said interior bore of said spout pipe unit; and a ball spring disposed in said large diameter front section of said interior bore of said spout pipe unit so as to bias said ball to close a front end of said small-diameter rear section of said interior bore of said spout pipe unit, thereby preventing grease in said small-diameter rear section from forward movement to said spout outlet of said spout pipe unit through said large-diameter front section unless an additional force is applied to the grease in said small-diameter rear section, a compression force of said ball spring being larger than a pushing force of said tube piston toward grease in said grease storage chamber of said grease storage tube so as to prevent grease coming from said grease storage tube from accessing said spout outlet of said spout pipe unit unless an additional force is applied to the grease in said small-diameter rear section, compressed air flowing from said air passage of said grip into said rear air chamber in said barrel urging said barrel piston and said piston rod forward to impel the grease in said grease passage space into said spout pipe unit so as to move said ball forward, thereby enabling grease to access and move from said spout outlet of said spout pipe.

2. An air grease gun as claimed in claim 1, wherein said grease storage tube includes a coiled guide spring which is attached coaxially to a bottom surface of said tube piston and which has an outer diameter slightly smaller than inner diameter of said grease storage tube so as to maintain said tube piston in a horizontal position when said tube piston slides axially in said grease storage tube.

\* \* \* \* \*